United States Patent
Kwon et al.

(10) Patent No.: US 8,427,816 B2
(45) Date of Patent: Apr. 23, 2013

(54) LOW-VOLTAGE AND HIGH-VOLTAGE INTEGRATED JUNCTION BOX

(75) Inventors: Guno Kwon, Gyeonggi-do (KR); Jiseon Lim, Gyeonggi-do (KR); Jeonghun Lee, Gyeonggi-do (KR)

(73) Assignees: Hyundai Motor Company, Seoul (KR); Kia Motors Corporation, Seoul (KR); Yura Corporation Co., Ltd, Cheongwon, Chungbuk (KR)

( * ) Notice: Subject to any disclaimer, the term of this patent is extended or adjusted under 35 U.S.C. 154(b) by 229 days.

(21) Appl. No.: 12/950,784

(22) Filed: Nov. 19, 2010

(65) Prior Publication Data

US 2012/0087064 A1   Apr. 12, 2012

(30) Foreign Application Priority Data

Oct. 11, 2010   (KR) .................. 10-2010-0098745

(51) Int. Cl.
*H02B 1/04* (2006.01)
*H01R 12/00* (2006.01)
(52) U.S. Cl.
USPC .......................... 361/643; 439/76.2
(58) Field of Classification Search .......... 361/622, 361/626, 641, 643; 439/76.2
See application file for complete search history.

(56) References Cited

U.S. PATENT DOCUMENTS

| | | | | |
|---|---|---|---|---|
| 5,822,189 A | * | 10/1998 | Isshiki | 361/736 |
| 6,670,548 B2 | * | 12/2003 | Sumida et al. | 174/50 |
| 7,470,130 B2 | * | 12/2008 | Kubota et al. | 439/76.1 |
| 2006/0211300 A1 | * | 9/2006 | Kubota et al. | 439/535 |

FOREIGN PATENT DOCUMENTS

| | | |
|---|---|---|
| JP | 2002-267698 A | 9/2002 |
| JP | 2004-114775 | 4/2004 |
| JP | 2005-035383 | 2/2005 |
| JP | 2006-327251 | 12/2006 |
| JP | 2009-033882 A | 2/2009 |
| JP | 2010-130713 A | 6/2010 |
| KR | 10-2003-0081691 A | 10/2003 |
| KR | 10-2009-0061335 | 6/2009 |

* cited by examiner

*Primary Examiner* — Gregory Thompson
(74) *Attorney, Agent, or Firm* — Edwards Wildman Palmer LLP; Peter F. Corless

(57) ABSTRACT

A low-voltage and high-voltage integrated junction box includes a high-voltage distribution part, a low-voltage control board, and a control box. The high voltage distribution part includes a high-voltage relay for applying/cutting high voltage to an output terminal by distributing high voltage applied from a high-voltage battery and a bus bar for transmitting the high voltage applied through the high-voltage relay to the output terminal. The low-voltage control board controls low-voltage load and controls a breakdown of the high-voltage distribution part and operation of electric components of a vehicle. The control box accommodates therein the high-voltage distribution part and the low-voltage control board. With this integrated injunction box, manufacturing costs can be reduced.

9 Claims, 3 Drawing Sheets

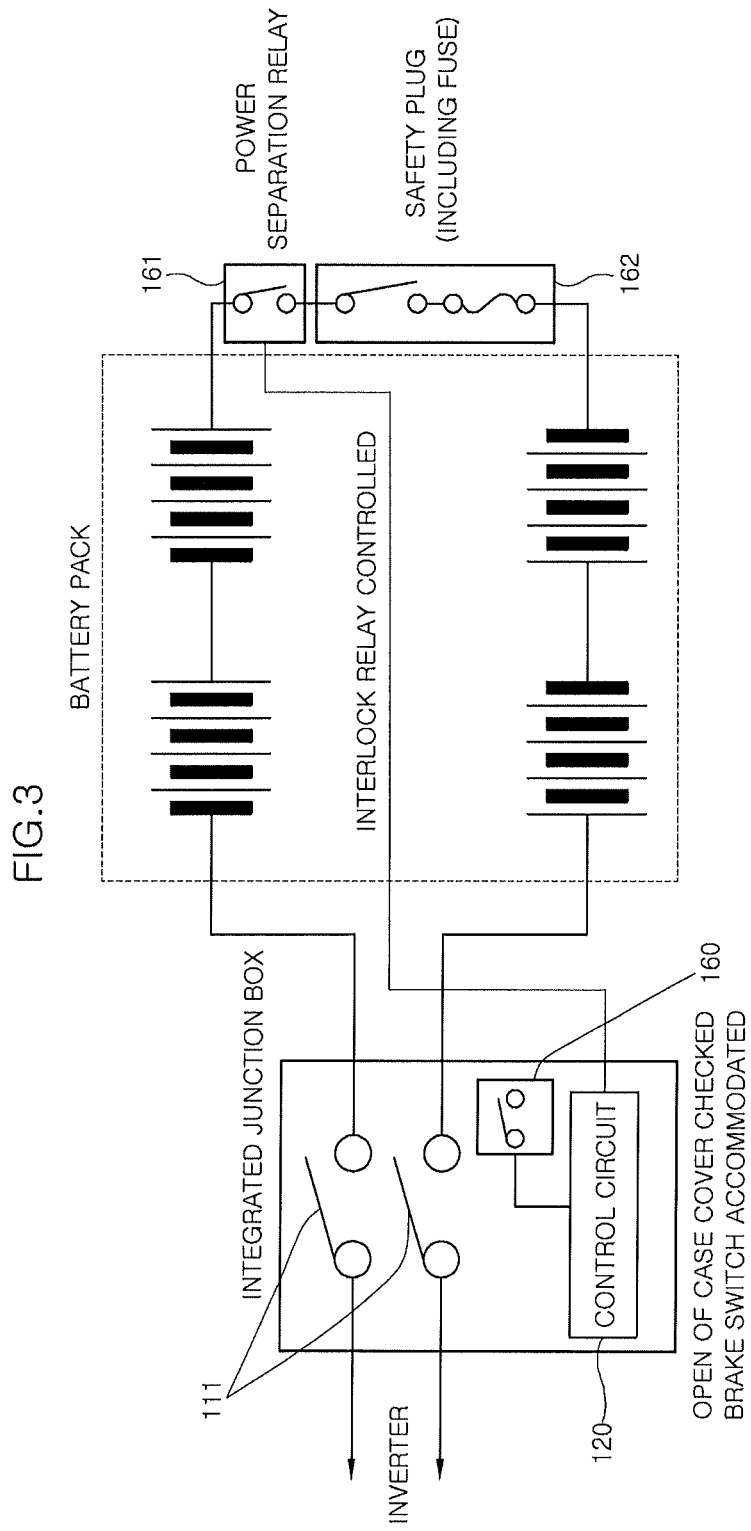

LOW-VOLTAGE AND HIGH-VOLTAGE INTEGRATED JUNCTION BOX

CROSS-REFERENCE TO RELATED APPLICATIONS

The present application claims priority to Korean Patent Application Number 10-2010-0098745 filed Oct. 11, 2010, the entire contents of which application are incorporated herein for all purposes by this reference.

BACKGROUND OF THE INVENTION

1. Field of the Invention

The present invention relates to a low-voltage and high-voltage integrated junction box in which a high-voltage distribution part and a low-voltage control board are integrated.

2. Description of Related Art

A battery is used as energy source and/or energy buffer in an electric vehicle, a hybrid electric vehicle, and a fuel cell hybrid electric vehicle. A hybrid vehicle includes an electric motor(s), various low-voltage electric components and wiring systems. If a lower voltage is used with a certain level of power maintained, the amount of current increases. It, however, causes the size of wires, weight, and manufacturing cost to be increased.

Although it is possible to reduce the amount of current by increasing voltage in order to remove the problem, using high voltage reduces compatibility with the existing low-voltage electric components and requires development of new electric components using high voltage.

Therefore, in order to solve the problems, not only a high-voltage junction box for operating a driving motor using high voltage and a high-voltage circuit for operating the high-voltage junction box but also a low-voltage circuit for controlling the operation of the electric components should be provided. However, there may be problems in operating the components of the circuit for operating the junction box due to the same components or interference between the electric components.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

An exemplary embodiment of the present invention provides a low-voltage and high-voltage integrated junction box, which includes a high-voltage distribution part, a low-voltage control board, and a control box. The high voltage distribution part includes a high-voltage relay for applying/cutting high voltage to an output terminal by distributing high voltage applied from a high-voltage battery and a bus bar for transmitting the high voltage applied through the high-voltage relay to the output terminal. The low-voltage control board controls low-voltage load and controls a breakdown of the high-voltage distribution part and operation of electric components of a vehicle. The control box accommodates therein the high-voltage distribution part and the low-voltage control board. The output terminal is exposed to an outside of the control box.

The low-voltage and high-voltage integrated junction box may further comprise a current sensor mounted on the bus bar for measuring current at high voltage flowing through the bus bar. The current sensor is controlled by the low-voltage control board.

The high-voltage distribution part may further include a pre-charging relay that supplies a small amount of current at high voltage to the output terminal to prevent the electric components from being damaged by rapid flow of current, before high voltage is applied to the output terminal. The high-voltage distribution part may further includes a resistor for limiting current applied to the pre-charging relay.

The low-voltage and high-voltage integrated junction may further comprise a brake switch mounted on the control box and exposed to an outside of the control box. It may further comprise a box cover that can cover both of the brake switch and the output terminal when the box cover is mounted on the control box. The box cover includes has a push rod that presses the brake switch when the box cover mounted on the control box, thereby causing the brake switch to be turned on and becomes separated from the brake switch 160 when the box cover is removed from the control box, thereby causing the brake switch to be turned off.

The high-voltage distribution part and the low-voltage control board may be accommodated in the control box so as to be spaced apart from each other to block electromagnetic waves.

According to the exemplary embodiment of the present invention, a low-voltage and high-voltage integrated junction box can be implemented in a small size by integrally forming a high-voltage distribution part distributing high voltage with a low-voltage control board that determines whether the high-voltage distribution part breaks and controls the operation of a relay and the operation of a low-voltage load. Further, according to the exemplary embodiment of the present invention, it is possible to prevent an electric shock accident due to high voltage by cutting power from a battery, when a cover for a high-voltage input terminal is exposed to the outside.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 3 is a circuit diagram illustrating the connection of a battery and the low-voltage and high-voltage integrated junction box shown in FIG. 1.

Figure 1:
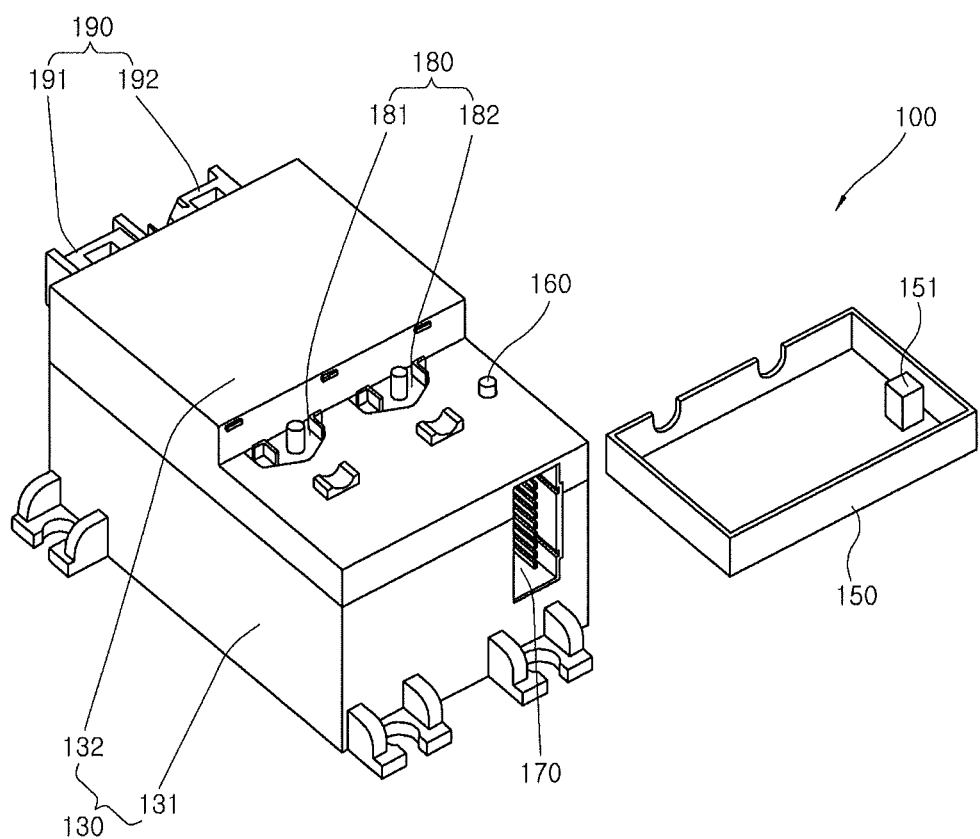
FIG. 1 is a perspective view showing a low-voltage and high-voltage integrated junction box according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
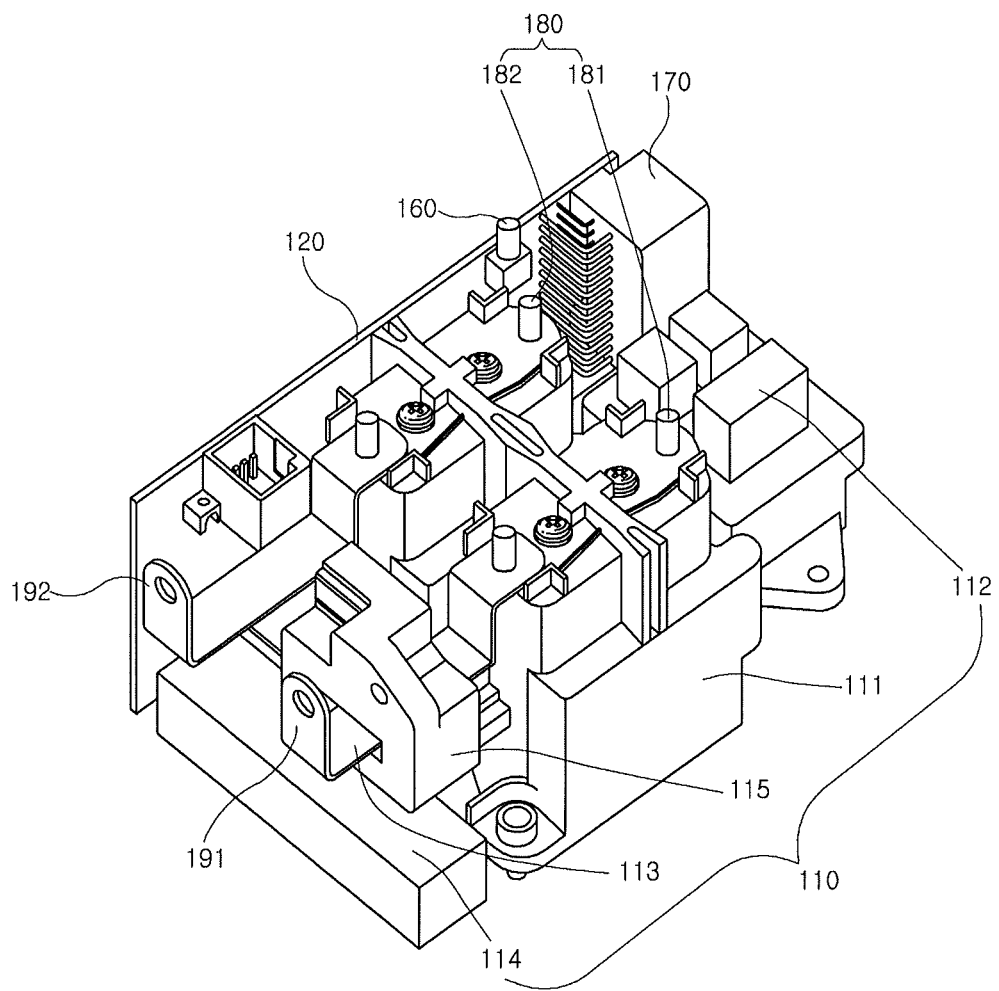
FIG. 2 is a perspective view showing the inside of the low-voltage and high-voltage integrated junction box shown in FIG. 1.

Referring to FIGS. 1 and 2, a low-voltage and high-voltage integrated junction box according to an embodiment of the present invention includes a high-voltage distribution part 110 for distributing high voltage, a low-voltage control board 120 for controlling electric components and diagnosing a breakdown, and a control box 130 for accommodating and protecting the high-voltage distribution part 110 and the low-voltage control board 120.

Preferably, the high-voltage distribution part 110 may include a high-voltage relay 111 and a bus bar 113. The high-voltage relay 111 distributes high voltage applied through an input terminal 180 electrically connected with a high-voltage battery (not shown) to apply/cut the high voltage to an output terminal 190. The input terminal 180 includes an anode terminal 181 and a cathode terminal 182. The anode terminal 181 and the cathode terminal 182 are exposed to an outside of the control box 130 and electrically connected to the anode and the cathode of the high-voltage battery, respectively. The output terminal 190 includes an anode terminal 191 and a cathode terminal 192. The anode terminal 191 and the cathode terminal 192 are exposed to an outside of the control box 130 and electrically connected with an inverter or other component(s) of a vehicle to supply power. The bus bar 113 is a conductor that can transmit the high voltage of the high-voltage battery which is applied through the high-voltage relay 111 to the output terminal 190.

The high-voltage distribution part 110 may further include a pre-charging relay 112, a resistor 114, or both. The pre-charging relay 112 supplies initial current which supplies a small amount of current at high voltage to the output terminal 190 in order to prevent electric components of a vehicle from being damaged by rapid flow of current due to high voltage, before high voltage is applied from the high-voltage battery to the output terminal 190. The pre-charging relay 112 is electrically connected with the resistor 114 and limits the initial current that is supplied to the output terminal 190 through the resistor 114. As a non-limiting example, the resistor 114 may be made of cement.

The high-voltage distribution part 110 may further include a current sensor 115. The current sensor 115 is mounted on the bus bar 130 electrically connected with the anode terminal 191 of the output terminal 190 and senses current flowing through the bus bar 130.

The low-voltage control board 120 can minimize maintenance by controlling low-voltage load of the low-voltage and high-voltage integrated junction box 100, by using an intellectual power semiconductor. Further, the low-voltage control board 120 may suitably be provided with a configuration for network communication with the low-voltage electric components in the vehicle.

The low-voltage control board 120 determines whether the high-voltage distribution part 110 breaks from the current measured by the current sensor 115 of the high-voltage distribution part 110 and supplies driving power to the high-voltage relay 111 and the pre-charging relay 112 to control their operation.

The low-voltage control board 120 may preferably be spaced at a predetermined distance from the high-voltage distribution part 110 to eliminate or minimize occurrence of the electromagnetic waves between the high-voltage distribution part 110 and the low-voltage control board 120.

The control box 130 includes a control box body 131 with the top open and a control box cover 132 covering the top of the control box body 131. The high-voltage distribution part 110 and the low-voltage control board 120 are accommodated in predetermined positions inside the control box 130. As a non-limiting example, the control box 130 may be a rectangular or substantially box.

The input terminal 180 is exposed to an outside of the control box 130. Further, a brake switch 160 is exposed to an outside of the control box 130. The brake switch 160 is electrically connected to the low-voltage control board 120, as shown in FIG. 3. Further, the low-voltage control board 120 controls the operation of a power separation relay 161 that is interposed between batteries or battery modules and can cut the power that is applied to the input terminal 180 of the high-voltage distribution part 110 by separating a power source from the batteries or battery modules by the operation of the brake switch 160.

Preferably, a box cover 150 that can cover all of the input terminal 180 and the brake switch 160 may be provided. The box cover 150 is provided with a push rod 151 at a predetermined position. In this case, when the box cover 150 is mounted on the control box 130, the push rod 151 can press the brake switch 160, thereby causing the brake switch 160 to be turned on. On the other hand, when the box cover 150 is removed from the control box 130, the push rod 151 becomes separated from the brake switch 160, thereby causing the brake switch 160 to be turned off.

Further, even when the brake switch 160 is turned off, the low-voltage control board 120 still can cut the power applied to the input terminal 180 by turning off the power separation relay 161 to prevent damage from the high voltage applied from the battery or battery module, thereby improving stability of the low-voltage and high-voltage integrated junction box.

In addition, a safety plug 162 may be provided, as shown in FIG. 3. The safety plug 162 is electrically connected to batteries or battery modules. By using the safety plug 162, the power between the batteries or battery modules can be cut, thereby being able to cut the high voltage that is applied from the batteries or battery modules to the low-voltage and high-voltage integrated junction box.

The low-voltage and high-voltage integrated junction box further may further include a connector 170 that can be connected to a wiring harness of the vehicle to supply power to the electric components in the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A low-voltage and high-voltage integrated junction box, comprising:
    a high-voltage distribution part including a high-voltage relay for applying/cutting high voltage to an output terminal by distributing high voltage applied from a high-voltage battery and a bus bar for transmitting the high voltage applied through the high-voltage relay to the output terminal;
    a low-voltage control board for controlling low-voltage load and controlling a breakdown of the high-voltage distribution part and operation of electric components of a vehicle;
    a control box accommodating therein the high-voltage distribution part and the low-voltage control board, wherein the output terminal is exposed to an outside of the control box; and
    a current sensor mounted on the bus bar for measuring current at high voltage flowing through the bus bar, wherein the current sensor is controlled by the low-voltage control board.

2. The low-voltage and high-voltage integrated junction box as defined in claim 1, wherein the high-voltage distribution part further includes a pre-charging relay that supplies a small amount of current at high voltage to the output terminal to prevent the electric components from being damaged by rapid flow of current, before high voltage is applied to the output terminal.

3. The low-voltage and high-voltage integrated junction box as defined in claim 2, wherein the high-voltage distribution part further includes a resistor for limiting current applied to the pre-charging relay.

4. The low-voltage and high-voltage integrated junction box as defined in claim 1, further comprising:
    a brake switch mounted on the control box and exposed to an outside of the control box; and
    a box cover that can cover the brake switch when the box cover is mounted on the control box.

5. The low-voltage and high-voltage integrated junction box as defined in claim 4, wherein the box cover includes has a push rod that presses the brake switch when the box cover mounted on the control box, thereby causing the brake switch to be turned on and becomes separated from the brake switch 160 when the box cover is removed from the control box, thereby causing the brake switch to be turned off.

6. The low-voltage and high-voltage integrated junction box as defined in claim 1, wherein the high-voltage distribution part and the low-voltage control board are spaced apart from each other so as to block electromagnetic waves.

7. A low-voltage and high-voltage integrated junction box, comprising:
    a high-voltage distribution part including a high-voltage relay for applying/cutting high voltage to an output terminal by distributing high voltage applied from a high-voltage battery and a bus bar for transmitting the high voltage applied through the high-voltage relay to the output terminal;
    a low-voltage control board for controlling low-voltage load and controlling a breakdown of the high-voltage distribution part and operation of electric components of a vehicle;
    a control box accommodating therein the high-voltage distribution part and the low-voltage control board, wherein the output terminal is exposed to an outside of the control box;
    wherein the high-voltage distribution part further includes a pre-charging relay that supplies a small amount of current at high voltage to the output terminal to prevent the electric components from being damaged by rapid flow of current, before high voltage is applied to the output terminal.

8. The low-voltage and high-voltage integrated junction box as defined in claim 7, wherein the high-voltage distribution part further includes a resistor for limiting current applied to the pre-charging relay.

9. A low-voltage and high-voltage integrated junction box, comprising:
    a high-voltage distribution part including a high-voltage relay for applying/cutting high voltage to an output terminal by distributing high voltage applied from a high-voltage battery and a bus bar for transmitting the high voltage applied through the high-voltage relay to the output terminal;
    a low-voltage control board for controlling low-voltage load and controlling a breakdown of the high-voltage distribution part and operation of electric components of a vehicle;
    a control box accommodating therein the high-voltage distribution part and the low-voltage control board, wherein the output terminal is exposed to an outside of the control box;
    a brake switch mounted on the control box and exposed to an outside of the control box; and
    a box cover that can cover the brake switch when the box cover is mounted on the control box.

* * * * *